United States Patent
Shatley et al.

(10) Patent No.: US 9,415,952 B2
(45) Date of Patent: Aug. 16, 2016

(54) SECTIONAL PALLETIZER WITH CONVEYER SYSTEM

(71) Applicants: Daniel Paul Shatley, West Jefferson, NC (US); Jeffrey Thomas Badger, North Jefferson, NC (US)

(72) Inventors: Daniel Paul Shatley, West Jefferson, NC (US); Jeffrey Thomas Badger, North Jefferson, NC (US)

( * ) Notice: Subject to any disclaimer, the term of this patent is extended or adjusted under 35 U.S.C. 154(b) by 703 days.

(21) Appl. No.: 13/789,129

(22) Filed: Mar. 7, 2013

(65) Prior Publication Data

US 2014/0251165 A1    Sep. 11, 2014

(51) Int. Cl.

| | |
|---|---|
| *B65B 13/20* | (2006.01) |
| *B65G 57/00* | (2006.01) |
| *B65B 27/10* | (2006.01) |
| *B65B 13/18* | (2006.01) |
| *B65B 35/50* | (2006.01) |
| *B65B 35/00* | (2006.01) |
| *B65B 35/42* | (2006.01) |
| *B65B 13/14* | (2006.01) |
| *B65B 27/12* | (2006.01) |

(52) U.S. Cl.
CPC .............. *B65G 57/00* (2013.01); *B65B 13/14* (2013.01); *B65B 13/18* (2013.01); *B65B 13/20* (2013.01); *B65B 27/10* (2013.01); *B65B 27/12* (2013.01); *B65B 35/00* (2013.01); *B65B 35/42* (2013.01); *B65B 35/50* (2013.01)

(58) Field of Classification Search
CPC ........ B65B 13/02; B65B 13/14; B65B 13/18; B65B 13/20; B65B 27/10; B65B 27/12; B65B 35/00; B65B 35/10; B65B 35/22; B65B 35/30; B65B 35/40; B65B 35/42; B65B 35/50; B65G 57/00
USPC ........ 100/3, 7, 8, 26, 218; 414/788.1; 53/527, 53/528, 529, 589
See application file for complete search history.

(56) References Cited

U.S. PATENT DOCUMENTS

| | | | | |
|---|---|---|---|---|
| 3,511,173 A | * | 5/1970 | Morrow ................. | B65B 27/10 100/14 |
| 4,483,245 A | * | 11/1984 | Fetters .................... | B65B 13/20 100/100 |
| 5,027,700 A | * | 7/1991 | Tschesche ............. | B65G 61/00 100/14 |
| 6,119,604 A | * | 9/2000 | Thomsen ............... | B65D 19/06 108/55.1 |
| 6,230,383 B1 | * | 5/2001 | Welleman .......... | B65D 19/0095 100/26 |
| 2009/0000917 A1 | | 1/2009 | Busch | |

OTHER PUBLICATIONS

Wikipedia article titled "Palletizer" published at http://en.wikipedia.org/wiki/Palletizer, Jun. 8, 2012.
Excerpt from video titled "Christmas Tree Palletizer—Packaging Machine" found at http://ww.youtube.com/watch?v=EO_O7FT1tE4 uploaded Jun. 10, 2010.
Excerpt from video found at http://ww.youtube.com/watch?v=hvZkkXlkAuk published May 4, 2012.
Excerpt from video found at http://ww.youtube.com/watch?v=rqX2rJ5__bE4 uploaded Feb. 1, 2011.
Excerpt from video found at http://ww.youtube.com/watch?v=OU9GBgD__fKY uploaded Jan. 19, 2010.

* cited by examiner

*Primary Examiner* — Jimmy T Nguyen
(74) *Attorney, Agent, or Firm* — David M. Carter; William G. Heedy; The Van Winkle Law Firm (57) ABSTRACT

An apparatus for stacking and retaining goods such as Christmas trees on a pallet includes a conveyor moving pallets from one end of the conveyor to an opposite end of the conveyor. The conveyor has a stacking section, a clamping section, and an unload section. The stacking section has a stacking bin receiving trees on a pallet positioned within the stacking section, and the clamping section is positioned between the stacking section and the unload section of the conveyor. The clamping sections provides stabilizers for placing a case about the trees and banding reels for wrapping a band about a pallet of trees within the case. The unload section of the conveyor extends from the clamping section and positions a completely stacked and banded pallet of trees thereon while a different pallet is in the clamping section and yet another pallet is in the stacking section.

6 Claims, 11 Drawing Sheets

SECTIONAL PALLETIZER WITH CONVEYER SYSTEM

FIELD OF THE INVENTION

The invention relates to the field of conveyor systems, particularly systems that arrange bulky items on a pallet for shipping.

BACKGROUND OF THE INVENTION

Numerous industries ship goods on pallets, such as simple wood planks connected to either side of supporting risers so that the pallets each have a base that touches the ground and a support surface bearing a load. A space in between the base and the support surface provides an opening through which a fork lift can carry the pallet and load. Utilizing a fork lift to carry pallets of goods from one place to another, however, assumes that the goods are neatly stacked on the pallet and conveniently wrapped in plastic or other strapping material to hold the goods in place during transit.

Certain goods, however, are not amenable to neat stacks on a pallet and may not fit entirely on the pallet at all. Goods that come in non-standard or varying shapes and sizes require particular efforts in packing for transit. One product that is particularly difficult to pack is a Christmas tree that has been cut for seasonal decoration. Christmas trees are shipped long distances after harvesting and require a pallet to support stacks of trees and bands wrapped around the trees and pallets to hold the trees in place. Placing trees on a pallet in a horizontal position and then stretching a banding material around the trees is a time consuming and laborious task.

In systems of the prior art, palletizers that arrange goods on a pallet require extreme amounts of manual labor, especially in the case of a Christmas tree palletizer because the trees are unwieldy yet need to arrive at numerous destinations with limbs intact. The prior art systems, particularly systems packing Christmas trees, require operators to arrange the trees on a single pallet and then slide that pallet to a different area for strapping before being moved by a fork lift to a loading area for shipping. The use of manual labor limits processing to one pallet at a time with no efficiency in processing multiple pallets at once.

There is a need in the art of packing systems for a palletizer that arranges and secures goods of varying shapes and sizes, such as Christmas trees, on a pallet with the option of processing more than one pallet at a time.

BRIEF SUMMARY OF THE INVENTION

An apparatus for packaging Christmas trees on a pallet includes a stacking bin attached to a rail such that the stacking bin slides along the rail, wherein the stacking bin defines a pallet receptacle within the stacking bin for receiving a portable pallet thereon. The apparatus further includes a clamping section attached to the rail at an end opposite the stacking bin, wherein the stacking bin moves back and forth along the rail to and from the clamping section. The stacking bin deposits a pallet of trees into the clamping section. The clamping section defines first slat receptacles for positioning vertical slats onto the pallet of trees and second slat receptacles for positioning horizontal slats onto the pallet of trees. The vertical and horizontal slats form a case about the trees on the pallet.

In another embodiment, an apparatus for stacking and retaining Christmas trees on a pallet includes a stacking bin at a first end of a conveyor, a clamping section at a second end of said conveyor, and a rail on the conveyor receiving casters attached to the stacking bin, allowing the stacking bin to slide along the conveyor to and from the clamping section.

In yet another embodiment, an apparatus for stacking and retaining Christmas trees on a pallet includes a conveyor moving pallets from one end of the conveyor to an opposite end of the conveyor. The conveyor includes a stacking section, a clamping section, and an unload section. The clamping section is positioned between the stacking section and the unload section of the conveyor for wrapping a band about a first pallet of trees. The stacking bin receiving trees on a second pallet positioned within the stacking section while the first pallet is positioned within the clamping section. The unload section of the conveyor extends from the clamping section and positions a third pallet of trees thereon while the first pallet is in the clamping section and the second pallet is in the stacking section.

DETAILED DESCRIPTION

FIGS. 1-10 associated with this disclosure are particularly useful when viewed as time lapse images of the apparatus in use. Each step of each figure illustrates not only a particular function but also particular components that add to the unique construction. Terms used to describe each figure should be construed in their broadest sense and without limitation. The term "palletizer" encompasses all production equipment fitting the description herein without regard for the exact kind of pallet used therein or the product being packaged. Generally, a palletizer is a system that arranges goods on a pallet. Although the system is described as a Christmas tree palletizer in certain examples, such use is not limiting of the invention in any way, and the claims below may be applied to any palletizing equipment used for other goods as well.

Figure 1:
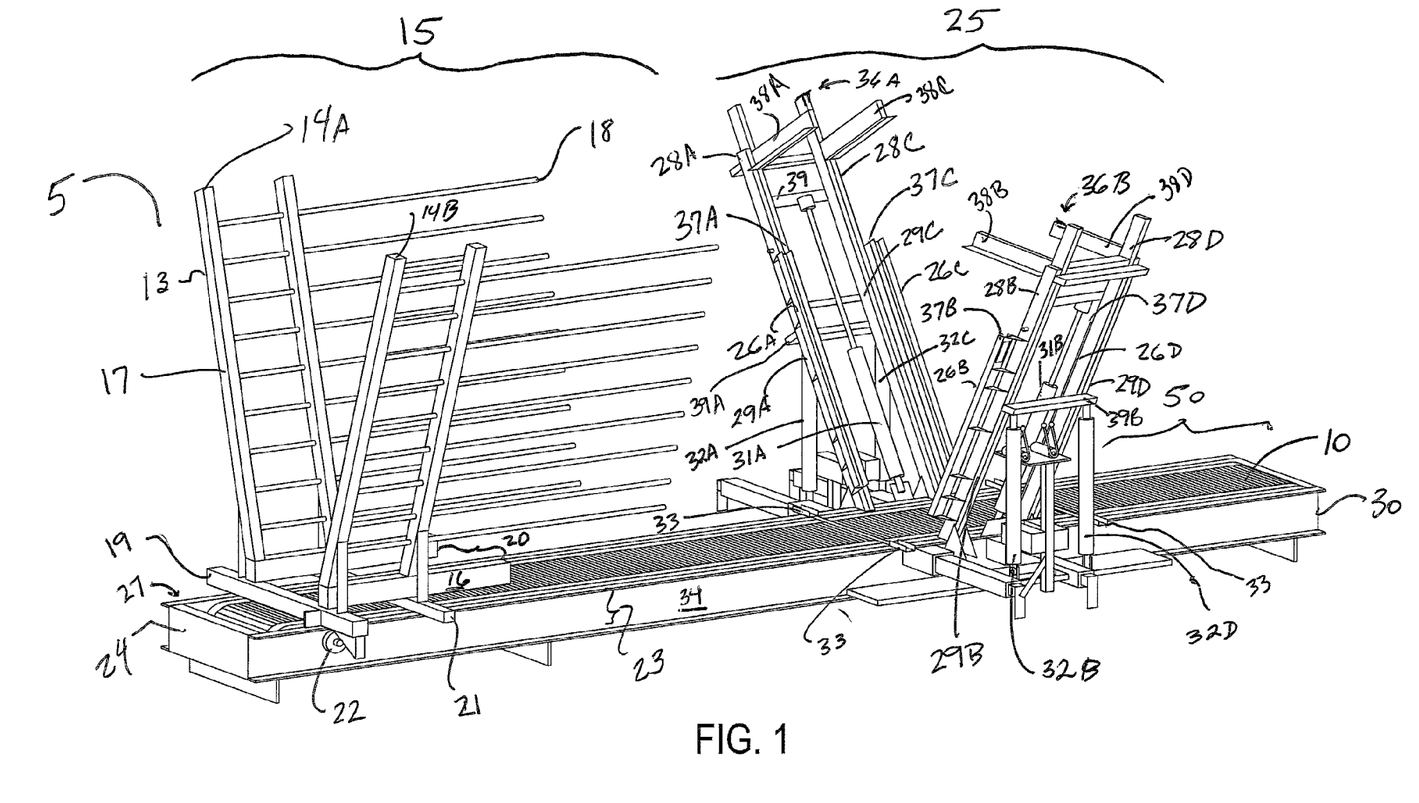
FIG. 1 is a perspective view of a palletizer according to the disclosure herein.

Beginning with FIG. 1, the palletizer disclosed herein includes three sections—a stacking section (15), a banding section (25) and an unload section (50). The palletizer (5) includes a conveyor (10), such as, for example, a conveyor belt engaging a rail (23). The term "conveyor" as used in this disclosure is intended to encompass any component that allows a pallet to be moved with reduced friction across a plane. A conveyor, therefore, encompasses rotating belts, chains, or rolling cylinders across which a pallet moves with increased efficiency. Pallets (12) used with the palletizer (5) move along the conveyor from one end (24) to an opposite end (30) of the conveyor (10). At one end (24) of the conveyor (10) oddly shaped, bulky goods such as Christmas trees (46) are placed within a stacking bin (17) that retains the goods in a particular arrangement for moving on a pallet (12) down the conveyor (10).

The stacking bin (17) is within the stacking section (15) at one end (24) of the conveyor (10). The stacking bin (17) includes casters (22), such as wheels, connected to a rail (23) supporting the conveyor (10). The engagement of the casters (22) and the rail (23) allows the stacking bin (17) to move along the rail and therefore along the conveyor. The stacking bin (17) defines a pallet receptacle (20) in which a pallet is placed to receive goods such as, for example, Christmas trees (46). The pallet (12), of course, is portable and removable from the receptacle (20). The stacking bin (17) includes wall sections (14), which, in one non-limiting example, are angled and extend from the pallet receptacle (20). The angled wall sections (14A, 14B) may be pivoted along a base (16) of the stacking bin (17) so that the wall sections are disposed about the goods, such as Christmas trees, and can compress the Christmas trees into a reasonable size and shape for shipping.

The stacking bin (17) slides along the rail (23) toward an opposite end (30) of the conveyor (10) to deposit a pallet (12) into the banding section (25). Because the stacking bin (17) must retract from the banding section (25), the wall sections (14) include open ended extensions (18) that form outwardly extending prongs or fork-like projections that are unobstructed from top to bottom. In other words, the open ended extensions (18) connect at one end to the support beams (13) of the angled wall sections (14A, 14B) and are not connected to anything at an opposite end.

FIG. 1 also shows the details of the clamping section (25). The clamping section receives a pallet (12) along the conveyor (10) at an opposite end of the conveyor (30) compared to the one end (24) discussed above regarding the stacking section (15). The clamping section (25) receives the open ended extensions (18) of the stacking bin (17) and allows the conveyor (10) to position the pallet (12) bearing goods such as Christmas trees such that the pallet receives bands (35) about the pallet (12) and the Christmas trees (46).

Instead of placing the bands (35) directly onto the Christmas trees, the clamping section assists in forming a case about the goods. The palletizer (5) builds a case (FIG. 10, Ref. 52) about the goods by receiving vertical slats (44) and horizontal slats (45) that are stabilized about the pallet (12) and the Christmas trees (46). The clamping section (25), therefore, defines first slat receptacles (26) for positioning the vertical slats (45) therein and second slat receptacles (37) for placing the horizontal slats (45) therein. The slats may be wooden slats, such as 2-by-4 planks or any other elongated structure that can fit around the goods on the pallet (12).

In operation, the pallet (12) of goods such as Christmas trees (46) fits within the banding section (25) on the conveyor (10) after being deposited there by the stacking bin (17) sliding along the rail (23). The banding section (25) includes angled barricades (36A, 36B) on either side of the conveyor (10). The angled barricades (36) pivot in and out toward and away from the conveyor to allow operators to position the horizontal slats (45) and vertical slats (46) in the unit.

The clamping section (25), therefore, defines a passage way (26) serving as a vertical slat receptacle (26). The operator slides the vertical slats (44) into respective vertical slat receptacles (26A, 26B, 26C, 26D) that ultimately are pivoted along with the angled barricades (36A, 36B) toward the pallet of Christmas trees. The four vertical slats (44) are positioned alongside the pallet (12) and squeeze into the goods, or Christmas trees (46). The upper end of each vertical slat receptacle (26A-D), serves as a horizontal slat rest (37A, 37B, 37C, 37D) receiving the horizontal slats (45) forming an upper section of a case about the Christmas trees (46).

The clamping section (25) allows for proper movement of the components of the angled barricades (36A, 36B) so that the banding and case (FIG. 10, Ref. 52) construction can be completed before transporting a pallet of Christmas trees. In this regard, the angled barricades (36A, 36B) are pivoted toward and away from the conveyor (10) via the hydraulic pivot source (32) connected to a riser bar (39). Reference Nos. 36A and 36B denote each entire side of the clamping apparatus (i.e., the composite structures on either side of the conveyor are the "angled barricades (36A, 36B) within the clamping section (25)). The angled barricades (36A, 36B) are each connected to pivots at a lower end adjacent the conveyor. On each side of the conveyor, a respective pair of hydraulic pivot sources (32A, 32C; 32B, 32D) advance and retract a respective riser bar (39A, 39B) by moving the riser bar up and down relative to the conveyor. The riser bars (39A, 39B) push against a respective angled barricade (36A, 36B) to pivot each of the overall angled barricades (36A, 36B) so that upper portions of the angled barricades (36A, 36B) move inward closer to the center of the conveyor (10) as a respective riser bar (39A, 39B) elevates relative to the conveyor. The tops of the angled barricades (36A, 36B) move outward away from the center of the conveyor as the riser bar moves downward toward the conveyor (10).

Each of the barricades (36A, 36B) includes a pair of sliding uprights (28A, 28B, 28C, 28D) that has the freedom to move up and down away from and toward the conveyor (10). Each sliding upright (36A, 36B) is operatively connected to an hydraulic compressor source (31A, 31B) that moves the sliding upright (28A, 28B, 28C, 28D) up and down relative to the conveyor. The sliding uprights (28) mate with and slide relatively to the companion uprights (29A, 29B, 29C, 29D). The sliding uprights connect with compression bars (38A, 38B, 38C, 38D) extending perpendicularly from the sliding uprights so that as the sliding uprights (28A, 28B, 28C, 28D) move up and down toward and away from the conveyor (10), the perpendicular uprights compress the load of Christmas trees on the pallet (12). Compressing the load of trees allows for the banding process to begin.

Figure 2:
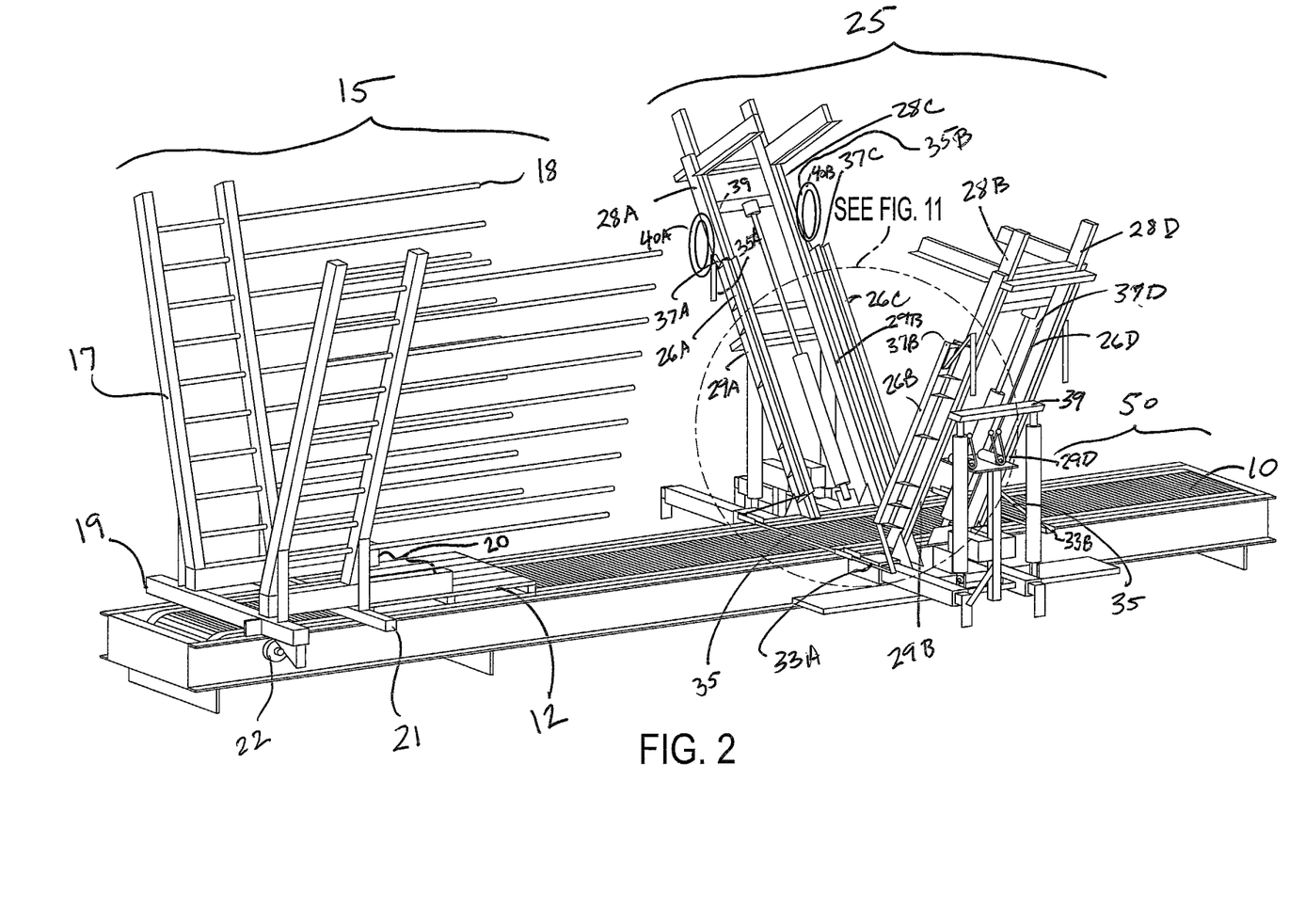
FIG. 2 is a perspective view of a palletizer according to FIG. 1 with a pallet positioned within the pallet receptacle of a stacking bin.

As shown best in FIG. 2, the clamping section (25) incorporates banding reels (40A, 40B) dispensing bands that wrap around and connect to the case formed by the pallet (12), the vertical slats (44), and the horizontal slats (45). The band (35) extends from the banding reels (40) with one end (42) wrapped around the pallet (12) and the Christmas trees (46).

Figure 3:
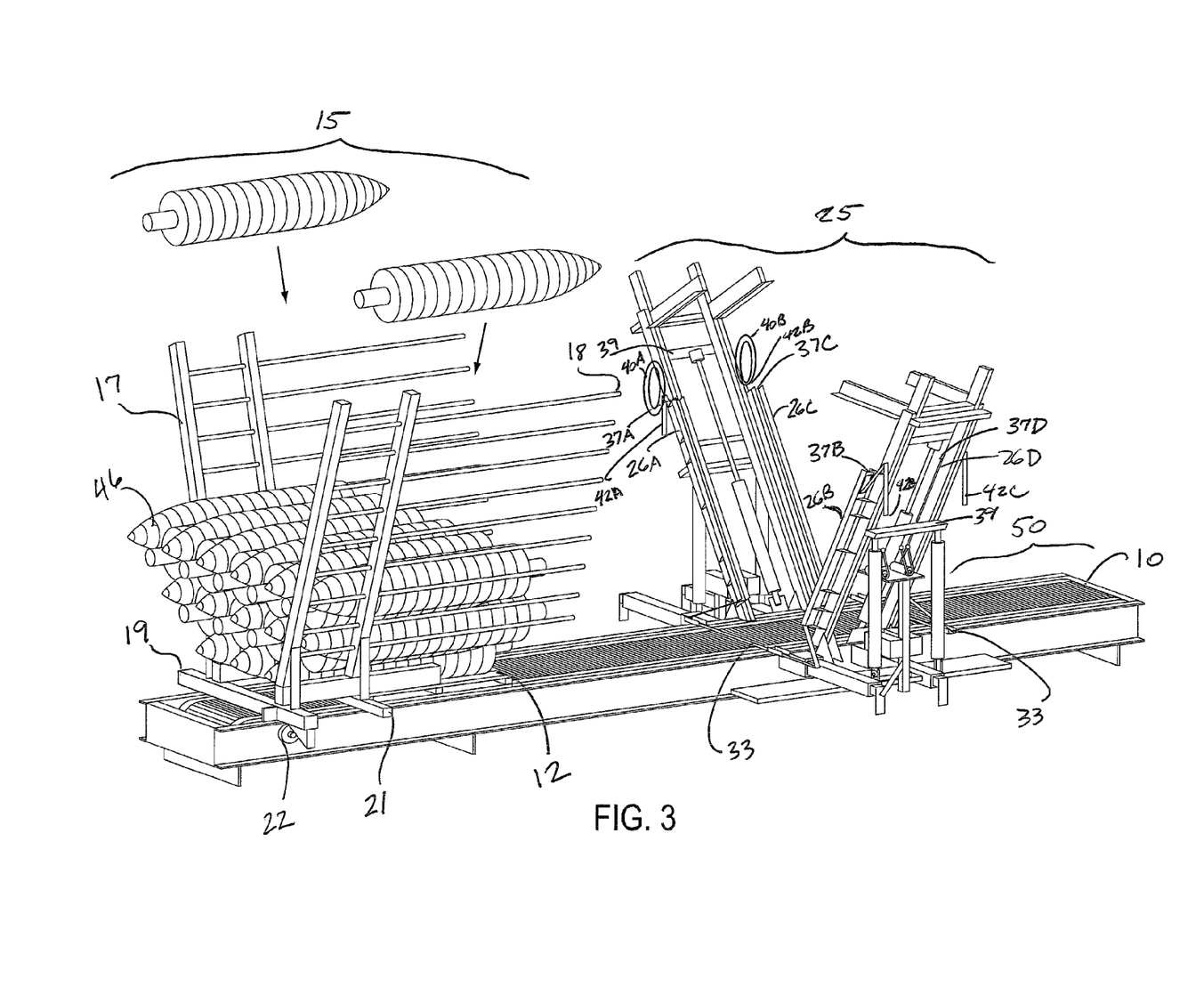
FIG. 3 is a perspective view of a palletizer according to FIG. 2 with a load of Christmas trees stacking onto the pallet.

FIG. 2 further shows a pallet (12) within the pallet receptacle (20) and ready to receive Christmas trees (46). The pallet (12) extends within the stacking bin (17) from a first open section of the stacking bin to a pallet stop (21). A back stop (19) completes the structure of the stacking bin. Also, the band (35A, 35B) for wrapping the pallet (12) and the load of trees extends from the banding reels (40) through band guides (33A, 33B) which are trench structures extending across the conveyor (10) from one of the angled barricades (36A) to an opposite angled barricade (36B). FIG. 3 illustrates the Christmas trees (46) being loaded into the stacking bin (17). As noted above, however, this invention is not limited to stacking only Christmas trees but can be used for other goods that are packed on a pallet for shipping.

Figure 4:
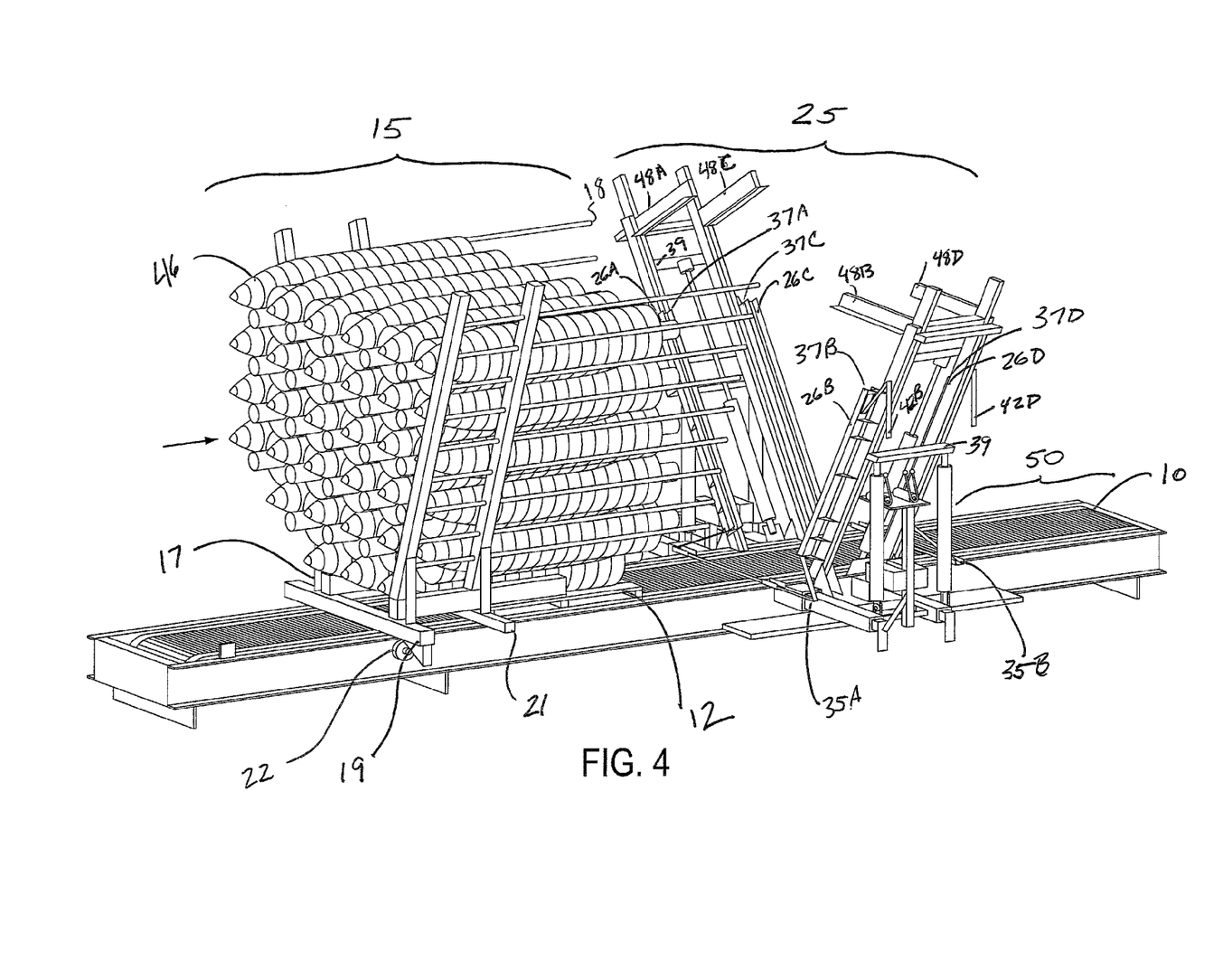
FIG. 4 is a perspective view of a palletizer according to FIG. 4 with the stacking bin sliding along a rail toward a clamping section of the palletizer.

FIG. 4 illustrates the stacking bin (17) sliding along the rail (23) via casters (22) to deliver the pallet (12) of Christmas trees to the clamping section (25). In the example shown in FIG. 4, the conveyor (10) moves the pallet (12) toward the clamping section (25), but as noted above the conveyor is just one apparatus used to move the pallet as other instruments (chains, rolling cylinders, and the like) may also be used instead of the conveyor. The pallet (12) slides over the bands (35A, 35B) tucked into the band guides (33A, 33B) extending parallel to one another along respective sections of the conveyor (10). Ultimately, the pallet (12) is positioned over both bands (35A, 35B). A sufficient length of each band (35A, 35B) is dispensed from the banding reels (40A, 40B) to wrap the bands entirely around the pallet (12) and the load of Christmas trees (46). As discussed below, the bands are connected to the case (FIG. 10, Ref. 52) surrounding the load of trees by fastening the bands (35A, 35B) to the vertical and horizontal slats (44A, 44B, 44C, 44D, 45A, 45B) that form the case (52). The fasteners may be staples, nails, screws, or the like and applied either by hand or mechanically to hold the band (35) to the slats of the case that is built about the load of trees.

Figure 5:
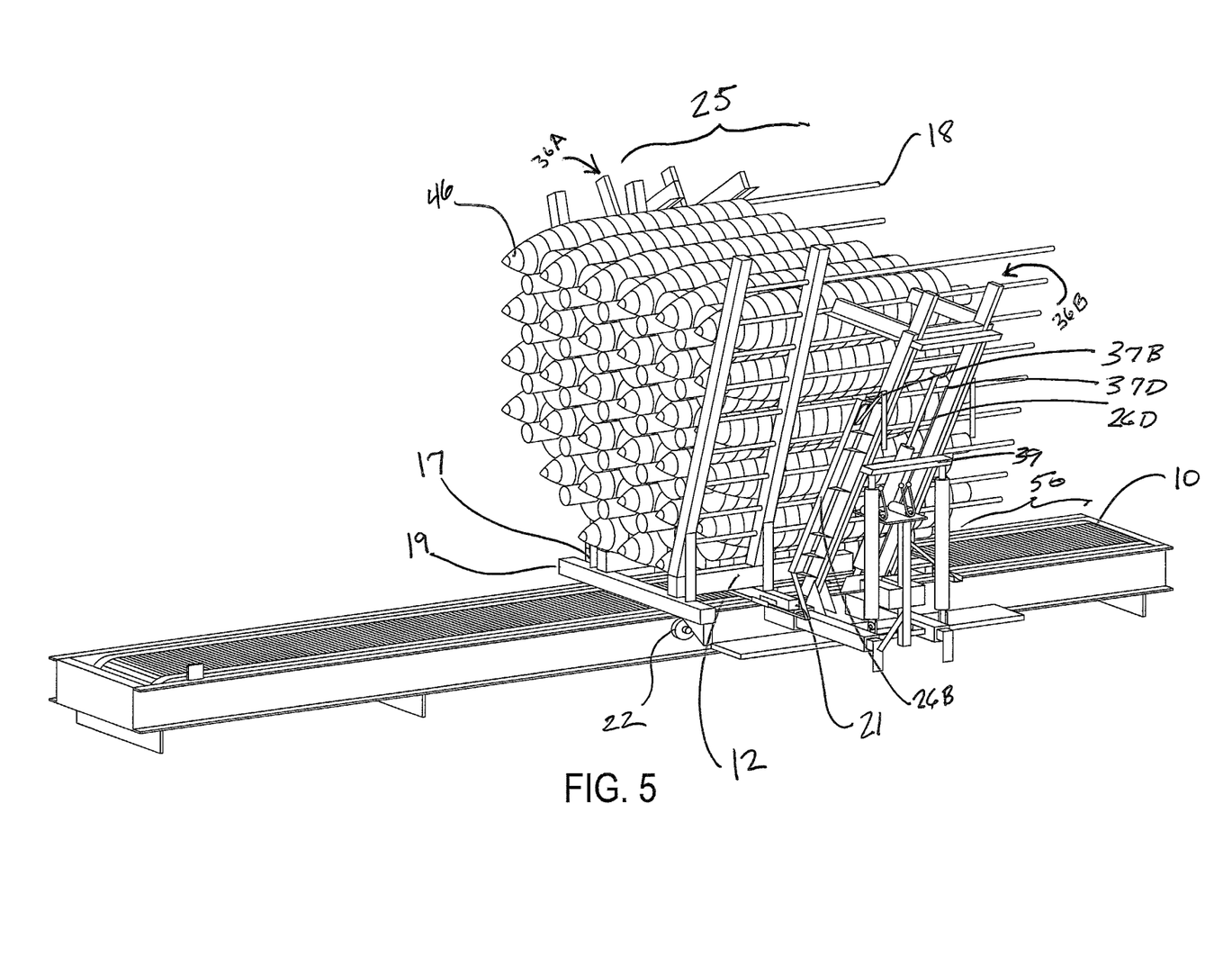
FIG. 5 is a perspective view of a palletizer according to FIG. 4 with the stacking bin positioned over bands within the clamping section of a palletizer as disclosed herein.
Figure 6:
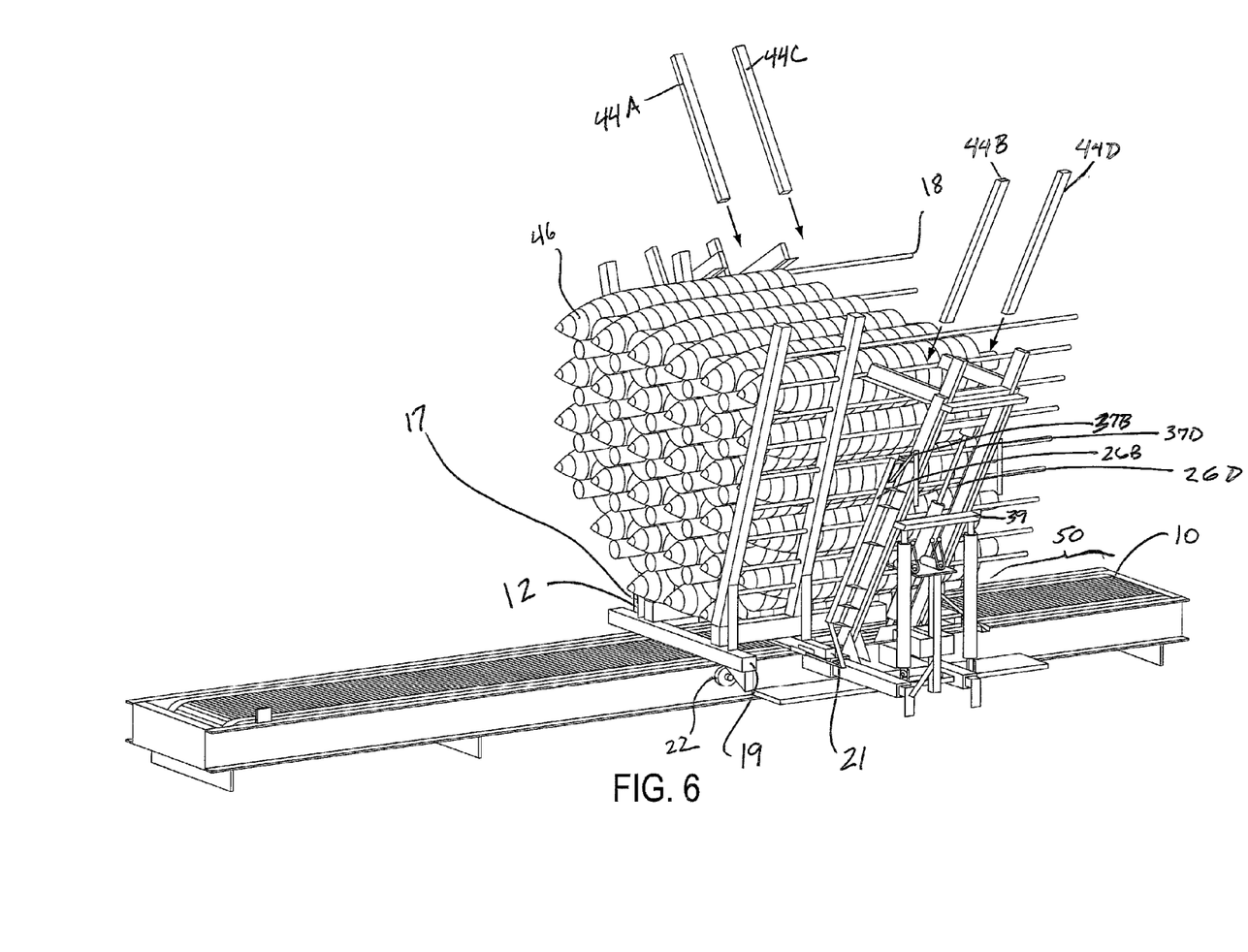
FIG. 6 is a perspective view of a palletizer according to FIG. 5 receiving vertical slats for forming a case about the load on a pallet.
Figure 7:
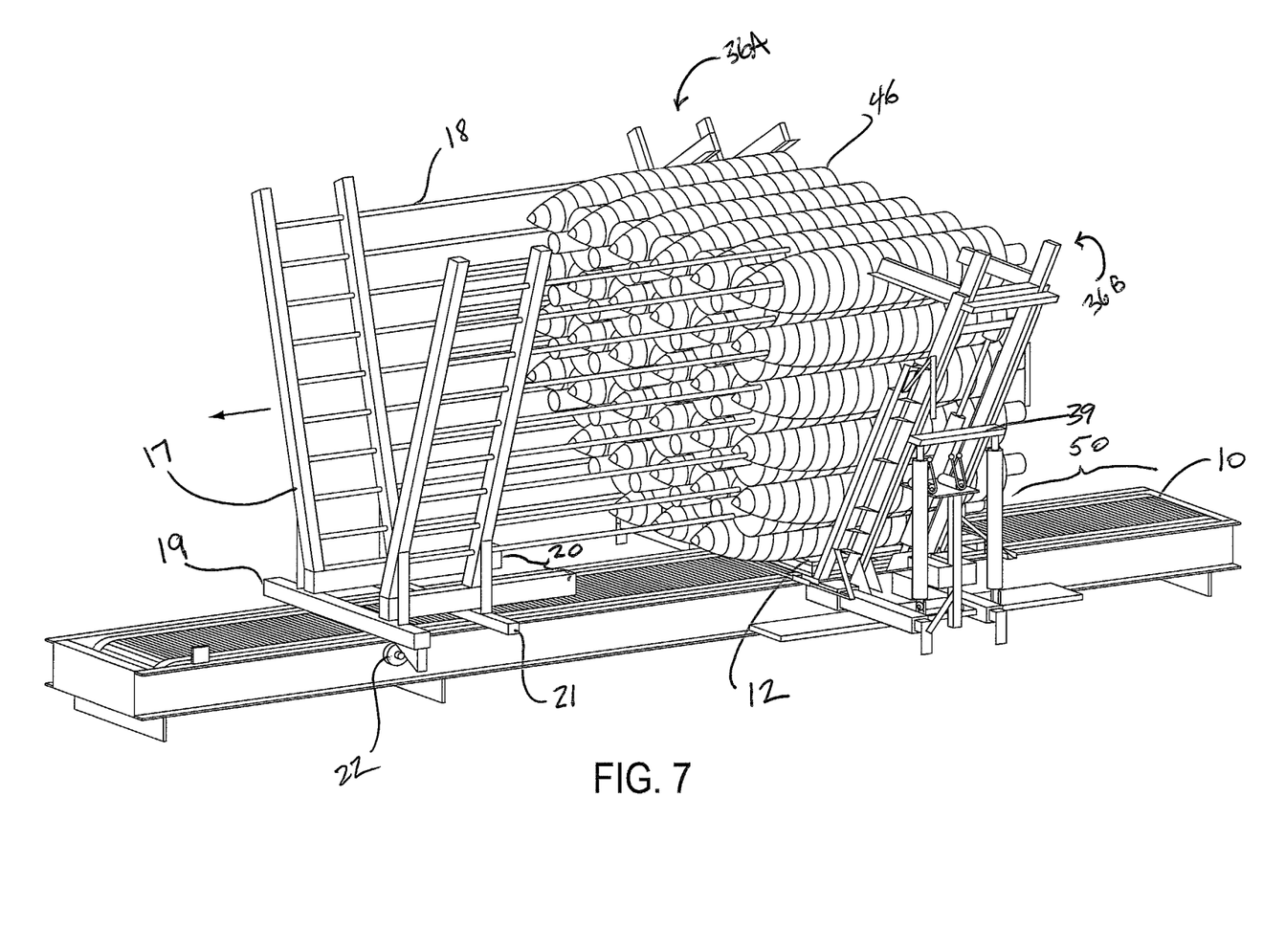
FIG. 7 is a perspective view of a palletizer according to FIG. 6 with the stacking bin retracting from the clamping section.

FIG. 5 illustrates the pallet (12) of Christmas trees (46) positioned entirely within the clamping section (25). In FIG. 5, the angled barricades (36A, 36B) are pivoted outward and away from the conveyor to receive the stacking bin (17) and the pallet (12) of trees. FIG. 6 shows the first step of the process of building a case (FIG. 10, Ref. 52) around the Christmas trees to hold them on the pallet (12) during moving and transit. In the example of FIG. 6, vertical slats (44A-44D) are placed within the vertical slat receptacles (26A-26D). Once the vertical slats are in place within the clamping section, the stacking bin (17) retracts via the casters (22) and rail (23) along the conveyor (10). Full retraction is available because the open ended extensions (18) have no barrier (i.e., the open ended extensions (18) are amenable to slide back out of the stack of trees while leaving the pallet (12) within the clamping section (25). The open ended extensions (18) are removable from the load of Christmas trees without damaging the trees, as shown in FIG. 7. When the stacking section (17) and the open ended projections (18) retract along the conveyor (10) back toward the stacking section (15) of FIG. 1, the pallet of trees is maintained within the clamping section (25) of FIG. 1 and within the angled barricades (36A, 36B).

Figure 8:
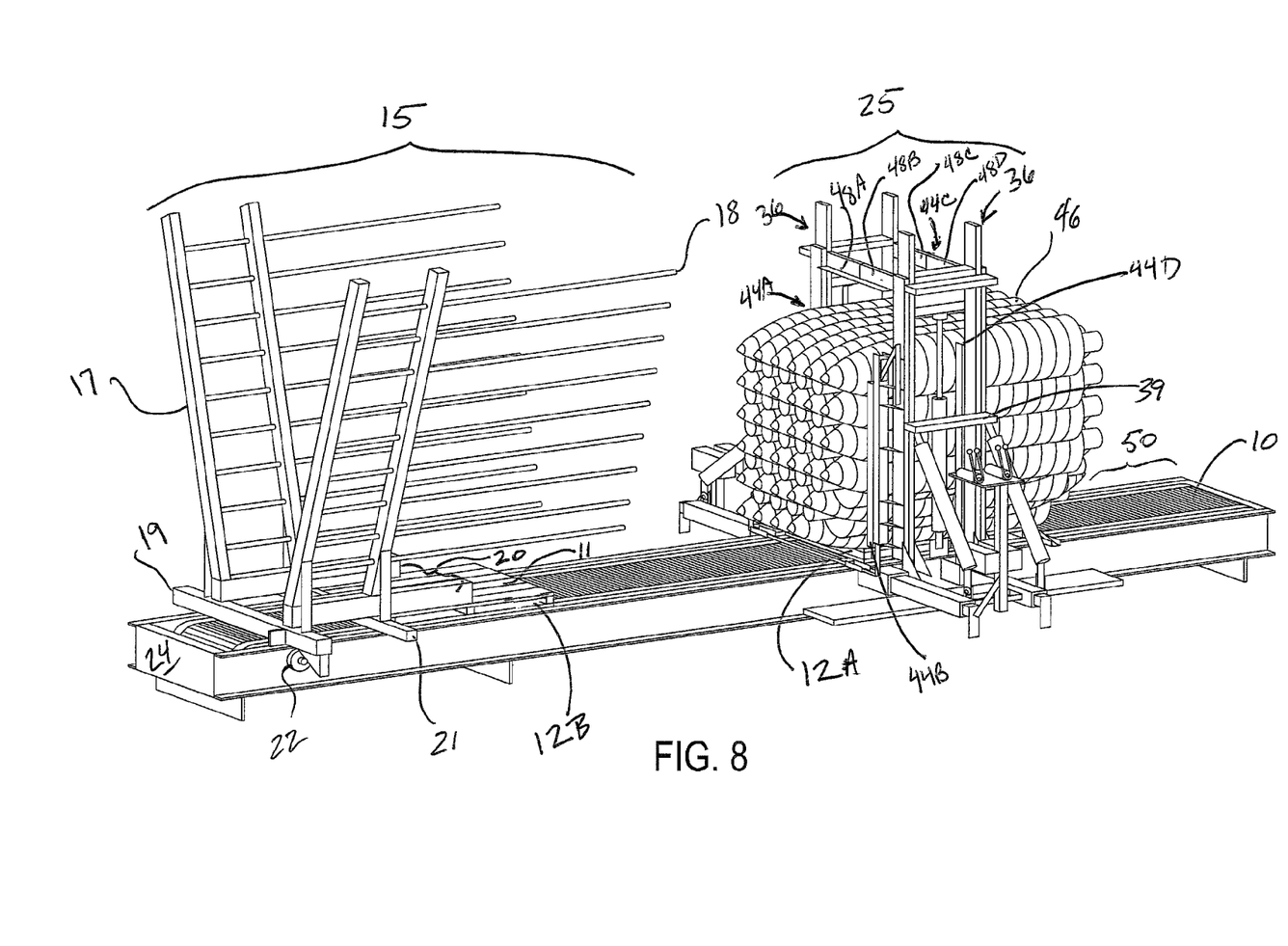
FIG. 8 is a perspective view of a palletizer according to FIG. 7 with the clamping section compressing the load of Christmas trees and receiving horizontal slats for completing a case about the load on the pallet.
Figure 9:
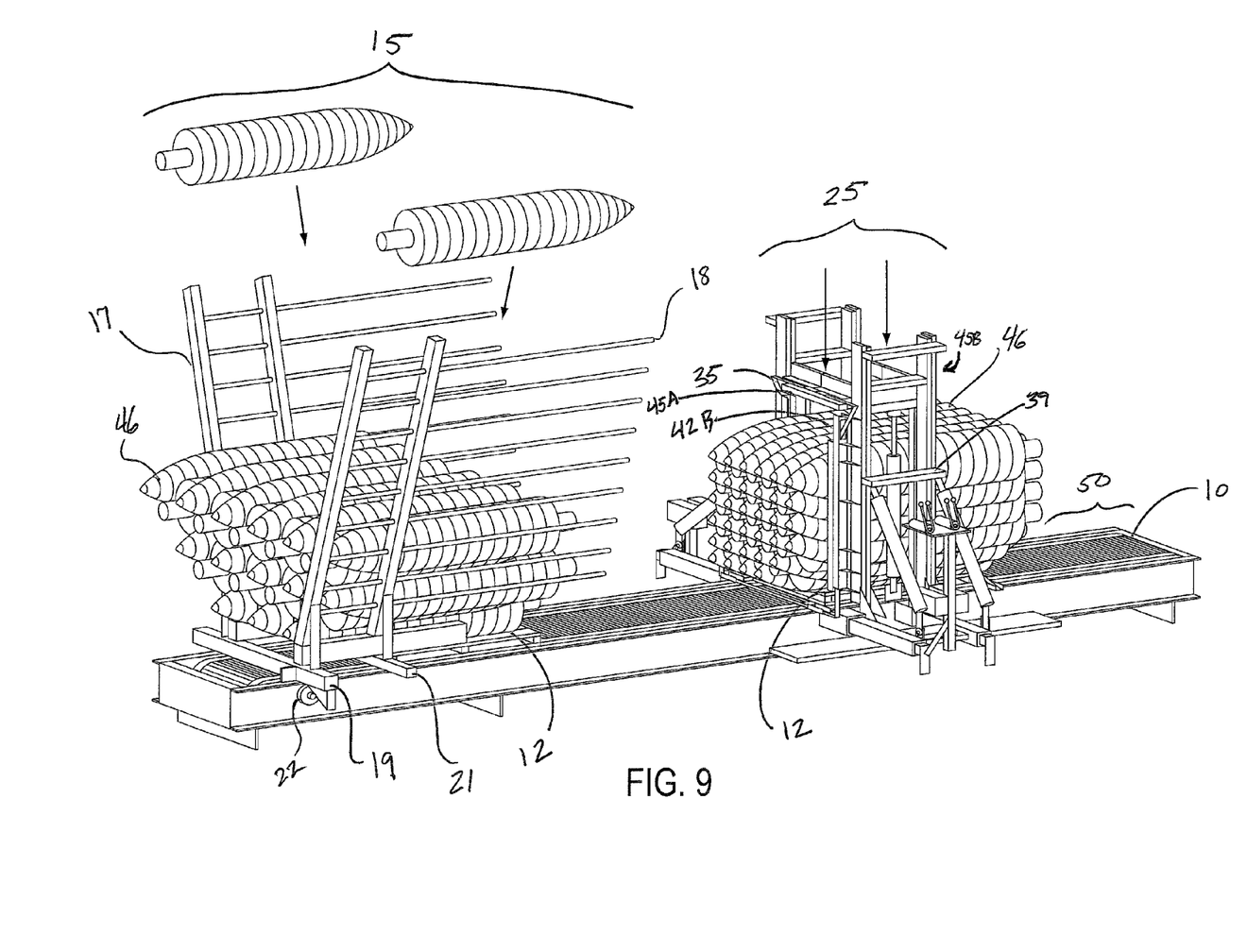
FIG. 9 is a perspective view of a palletizer according to FIG. 8 with the first pallet being banded while a second pallet receives an additional load of trees.
Figure 10:
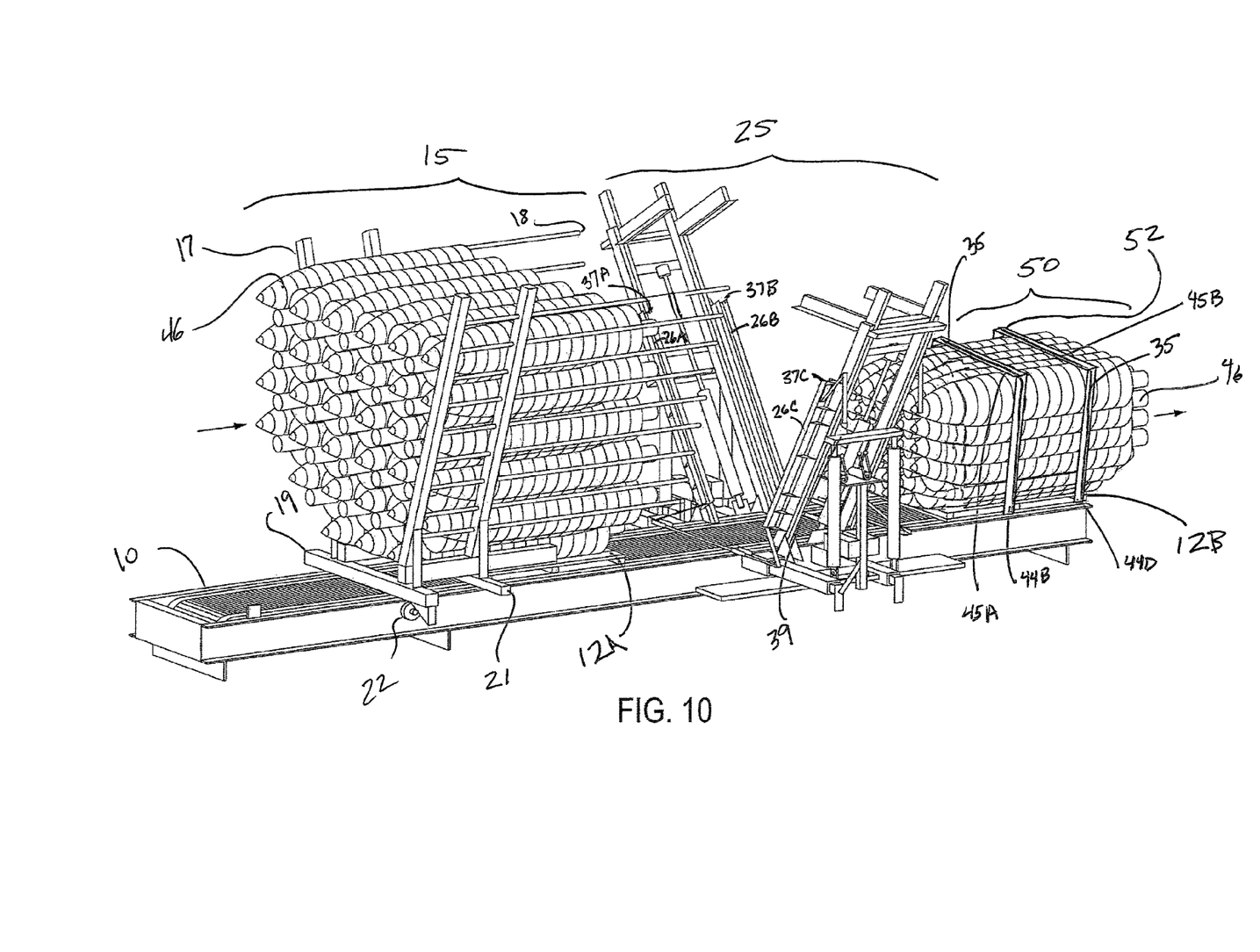
FIG. 10 is a perspective view of a palletizer according to FIG. 9 with the first load of trees moving to an unload section of the conveyor and the stacking bin delivering a second load of trees to the clamping section simultaneously.

FIG. 8 shows that the stacking bin (17) moves all the way back to an original position at one end (24) of the conveyor (10). The first pallet (12A) remains in the banding section (25), and the stacking bin (17) receives an empty pallet (12B) for stacking another load of Christmas trees. FIG. 8 also shows that the angled barricades (36) pivot to a substantially vertical position about the first load of Christmas trees on the first pallet (12A) to position the vertical slats (44) about four corners of the first pallet (12A). The compression bars (48A, 48B, 48C, 48D) meet and slide downwardly to compress the load of trees to a uniform shape for building a case about the trees and the pallet. The four vertical slats (44A, 44B, 44C, 44D) provide upright portions of the case (52), and, as shown in FIG. 9, horizontal slats (45A, 45B) provide two cross sections over the top of the load of Christmas trees. The compression bars (48A, 48B, 48C, 48D) press down onto the load of Christmas trees and position the horizontal slats (45A, 45B) over the trees. Ultimately, the bands (35A, 35B) are applied to the case formed by the four vertical slats (44A, 44B, 44C, 44D), the two horizontal slats (45A, 45B), and the pallet (12). Once the bands (35A, 35B) are in place about the pallet (12), the vertical slats (44A, 44B, 44C, 44D), and the horizontal slats (45A, 45B) the banded, cased load on the pallet (12) is moved down the conveyor to an unload section (50) of the conveyer body. As shown in FIG. 10, the next load of trees on a second pallet (12B) is ready to move into the clamping section. Depending on the scenario, the conveyor (10) may hold a pallet in the stacking bin, a different pallet in the clamping section, and a final pallet on the unload section simultaneously.

Figure 11:
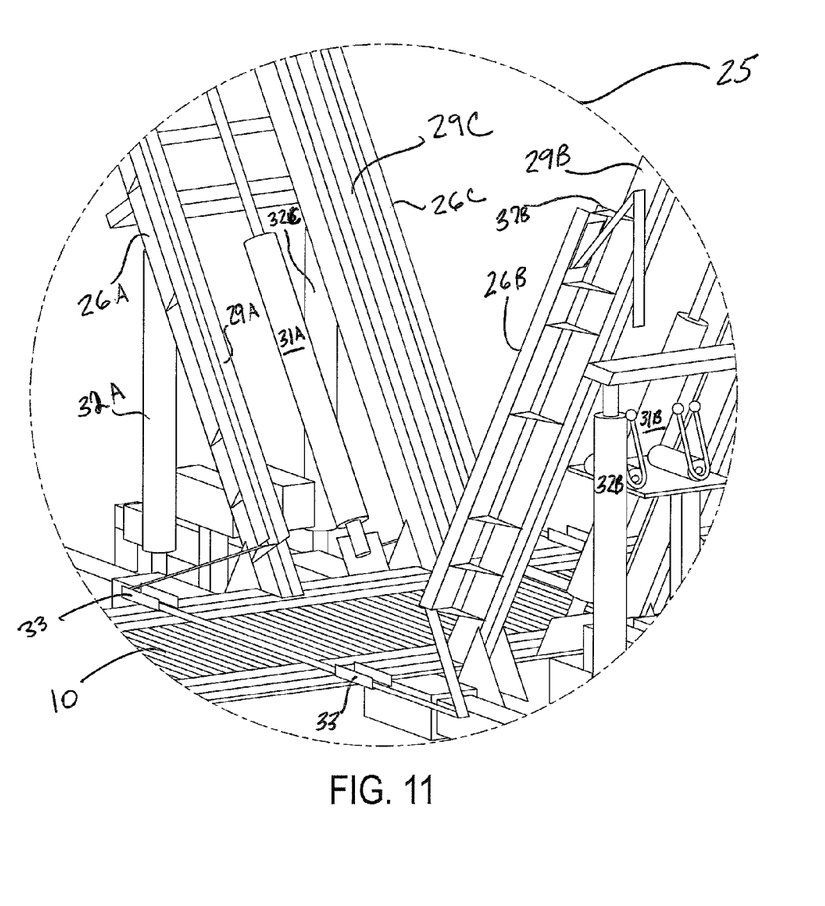
FIG. 11 is an inset view of the clamping section of a palletizer as disclosed herein.

Given the details above, the clamping section (25) is shown in an inset view in FIG. 11. The sides of the stacking bin (17) and the sides of the angled barricades (36A, 36B) can be moved in and out across the width of the conveyor (10) to accommodate pallets of varying sizes. As shown in FIG. 1, the conveyor assembly includes a first end (24), an opposite end (30), a first side (27), and a second side (34). In one non-limiting example, the first end (24) and opposite end (30) generally define the length dimension of the apparatus, and the first side (27) and the second side (34) generally define the width dimension of the apparatus.

The respective pivot points connecting the conveyor (10) to the stacking bin (17) and the angled barricades (36A, 36B) may be moved relative to the first side (27) and the second side (34) of the conveyor (10) so that the width dimension of the stacking section and the clamping section relative to the width dimension of the conveyor accommodates pallets of varying size. This feature further allows the user to decide whether to orient the pallet (12) on the conveyor so that the runners (11) of the pallet are parallel to the conveyor or perpendicular to the conveyor.

The embodiments of the invention shown in the Figures and discussed above are not intended to be limiting of the invention in any way. The invention is described in more detail through the claims below which are not exhaustive of the overall concept described herein.

The invention claimed is:

1. An apparatus for stacking and retaining Christmas trees on a pallet, the apparatus comprising:
   a conveyor moving pallets from one end of said conveyor to an opposite end of said conveyor, wherein said conveyor comprises a stacking section, a clamping section, and an unload section, said clamping section positioned between said stacking section and said unload section of said conveyor for wrapping a band about a first pallet of trees;
   a stacking bin secured to said conveyor and being structured and disposed for receiving trees on a second pallet positioned within said stacking section while the first pallet is positioned within said clamping section, the stacking bin is configured to slide along the conveyor to deliver the second pallet to the clamping section and retract all the way back to the stacking section leaving the second pallet in the clamping section;
   wherein said unload section of said conveyor extends from said clamping section and positions a third pallet of trees thereon while said first pallet is in said clamping section and said second pallet is in said stacking section; and
   wherein wrapping a band about the first pallet in the clamping section, receiving trees on the second pallet in the stacking section, and positioning the third pallet in the unload section are simultaneous processes on said conveyor.

2. An apparatus according to claim 1, further comprising a rail on said conveyor receiving casters attached to said stacking bin, allowing said stacking bin to slide along said conveyor to and from said clamping section.

3. An apparatus according to claim 1, further comprising a pair of banding reels for wrapping said pallet of trees with a band.

4. An apparatus according to claim 3, wherein the band extends from one side of said clamping section, under the first pallet of trees, and to an opposite side of said clamping section.

5. An apparatus according to claim 4, wherein said stacking bin comprises angled wall sections extending from a pallet receptacle.

6. An apparatus according to claim 5, wherein said angled wall sections pivot about the pallet receptacle to arrange the trees on a pallet into a compressed form.

* * * * *